United States Patent
Kodama et al.

(10) Patent No.: US 10,457,266 B2
(45) Date of Patent: Oct. 29, 2019

(54) SERIES HYBRID DRIVE UNIT

(71) Applicant: TOYOTA JIDOSHA KABUSHIKI KAISHA, Toyota-shi, Aichi (JP)

(72) Inventors: Takuya Kodama, Nisshin (JP); Akira Murakami, Gotemba (JP); Hideki Kubonoya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/995,492

(22) Filed: Jun. 1, 2018

(65) Prior Publication Data
US 2019/0009770 A1 Jan. 10, 2019

(30) Foreign Application Priority Data
Jul. 5, 2017 (JP) ................. 2017-132156

(51) Int. Cl.
| | |
|---|---|
| *B60W 10/08* | (2006.01) |
| *B60K 6/547* | (2007.10) |
| *F16H 61/684* | (2006.01) |
| *F16H 61/02* | (2006.01) |
| *B60L 50/61* | (2019.01) |
| *F16H 63/50* | (2006.01) |
| *B60K 6/442* | (2007.10) |
| *B60W 20/10* | (2016.01) |

(52) U.S. Cl.
CPC ............ *B60W 10/08* (2013.01); *B60K 6/547* (2013.01); *B60L 50/61* (2019.02); *F16H 61/0213* (2013.01); *F16H 61/684* (2013.01); *B60K 6/442* (2013.01); *B60W 20/10* (2013.01); *F16H 63/502* (2013.01)

(58) Field of Classification Search
CPC .......... B60W 10/08; B60W 20/10; B60K 6/46
See application file for complete search history.

(56) References Cited

U.S. PATENT DOCUMENTS

| | | | |
|---|---|---|---|
| 7,325,638 B1 * | 2/2008 | Belloso ................... | B60K 5/08 180/14.2 |
| 8,177,682 B2 * | 5/2012 | Chang ................... | B60W 10/30 180/53.8 |
| 8,561,744 B1 * | 10/2013 | Belloso ................... | B60K 5/08 180/69.6 |

(Continued)

FOREIGN PATENT DOCUMENTS

JP 2017-013752 A 1/2017

*Primary Examiner* — Brian L Swenson
(74) *Attorney, Agent, or Firm* — Oliff PLC

(57) ABSTRACT

A series hybrid drive unit that is downsized while improving power transmission efficiency. In the series hybrid drive unit, a generator is driven by an engine, and a motor is operated by electricity generated by the generator. Torque generated by the generator is delivered to drive wheels through a final reduction unit. An input member that is rotated by a torque of the engine, and that is arranged parallel to a rotational center axis Og of the generator. The generator and the motor are arranged parallel to each other while keeping a predetermined clearance, and the final reduction unit is arranged parallel to the motor. The input member and the generator are connected through a first wrapping transmission mechanism, and torque of the motor is transmitted to a final reduction unit through a second wrapping transmission mechanism.

14 Claims, 12 Drawing Sheets

(56) References Cited

U.S. PATENT DOCUMENTS

| | | | |
|---|---|---|---|
| 2008/0029361 A1* | 2/2008 | DeRoo | B60K 6/36 192/48.8 |
| 2009/0107739 A1* | 4/2009 | Major | B60K 6/485 180/53.8 |
| 2009/0288899 A1* | 11/2009 | Belloso | B60K 5/08 180/69.6 |
| 2014/0238758 A1* | 8/2014 | Barth | B60K 6/48 180/65.25 |
| 2016/0052382 A1* | 2/2016 | Clark | B60K 6/26 477/5 |
| 2018/0050686 A1* | 2/2018 | Atluri | B60K 6/387 |

* cited by examiner

SERIES HYBRID DRIVE UNIT

CROSS REFERENCE TO RELATED APPLICATIONS

The present disclosure claims the benefit of Japanese Patent Application No. 2017-132156 filed on Jul. 5, 2017 with the Japanese Patent Office, the disclosure of which are incorporated herein by reference in its entirety.

BACKGROUND

Field of the Disclosure

Embodiments of the present disclosure relate to the art of a series hybrid drive unit in which a generator is driven by an internal combustion engine, and a motor is operated by a power supplied from the generator to propel a vehicle.

Discussion of the Related Art

An example of this kind of hybrid drive unit is described in JP-A-2017-13752. In the series hybrid drive unit, a motor is operated by a power supplied from a generator to generate a torque to propel a vehicle. To this end, the generator and the motor are electrically connected to each other but may be separated from each other in the drive unit. In the hybrid drive unit taught by JP-A-2017-13752, the generator and the motor are arranged such that rotational center axes of the generator and the motor extend parallel to each other, and the generator and the motor are connected to each other through gears and clutches to form the hybrid drive unit.

Specifically, the hybrid drive unit taught by JP-A-2017-13752 is a multiaxis type drive unit in which the rotational center axis of the generator and the rotational center axis of the motor extend parallel to each other. However, a distance between the rotational center axes or rotor shafts of the generator and the motor is increased depending on outer diameters of the generator and the motor. In the hybrid drive unit taught by JP-A-2017-13752, a plurality of gears including a counter gear are required to connect the generator to the motor, and hence it is difficult to downsize the hybrid drive unit and to reduce a weight of the hybrid drive unit. In addition, bearings supporting the gears are required to receive not only a radial load but also a thrust load. Therefore, large number of the bearings is required and hence a power loss resulting from power transmission through the bearings is increased. In addition, a power loss between tooth faces of the gears is increased when setting a large speed reducing ratio or a large speed increasing ratio. Thus, it is difficult to downsize the conventional multiaxis type series hybrid drive unit while improving power transmission efficiency.

SUMMARY

Aspects of embodiments of the present disclosure have been conceived noting the foregoing technical problems, and it is therefore an object of the present disclosure is to downsize a series hybrid drive unit while improving power transmission efficiency.

The present disclosure relates to a series hybrid drive unit, in which a generator is driven by an engine, and a motor is operated by electricity generated by the generator to generate a torque to be delivered to drive wheels through a final reduction unit. According to the embodiment of the present disclosure, the series hybrid drive unit is provided with an input member that is rotated by a torque of the engine, and that is arranged such that a rotational center axis thereof extends parallel to a rotational center axis of the generator. The generator and the motor are arranged such that the rotational center axis of the generator and a rotational center axis of the motor extend parallel to each other while keeping a predetermined clearance. The final reduction unit is arranged such that a rotational center axis of the final reduction unit extends parallel to the rotational center axis of the motor. The series hybrid drive unit further comprises: a first wrapping transmission mechanism including a first drive sheave mounted on the input member, a first driven sheave mounted on the generator, and a first transmission member applied to the first drive sheave and the first driven sheave to transmit a torque therebetween; and a second wrapping transmission mechanism including a second drive sheave mounted on the motor, a second transmission member applied to the second drive sheave, and a second driven sheave to which the second transmission member is applied and which transmits the torque to the final reduction unit.

In a non-limiting embodiment, the first transmission member may include a chain, the first drive sheave and the first driven sheave may include a sprocket to which the chain is applied, the second transmission member may include another chain, and the second drive sheave and the second driven sheave may include a sprocket to which said another chain is applied.

In a non-limiting embodiment, the input member and the motor may be arranged coaxially to each other.

In a non-limiting embodiment, the first wrapping transmission mechanism and the second wrapping transmission mechanism may be disposed on both sides of the generator and the motor in a direction of the rotational center axis of the generator and the rotational center axis of the motor.

In a non-limiting embodiment, both of the first wrapping transmission mechanism and the second wrapping transmission mechanism may be disposed on one side of the generator and the motor in a direction of the rotational center axis of the generator and the rotational center axis of the motor.

In a non-limiting embodiment, the series hybrid drive unit may further comprise: a case; a housing attached to a first end of the case; an end cover attached to a second end of the case; a first chamber formed in the case; and a second chamber that is formed adjacent to the first chamber by the case and at least any one of the housing and the end cover. The generator and the motor may be held in the first chamber, and the first wrapping transmission mechanism and the second wrapping transmission mechanism may be held in the second chamber.

In a non-limiting embodiment, the series hybrid drive unit may further comprise: a case; a housing attached to a first end of the case; an end cover attached to a second end of the case; a bulkhead that is formed in the case to divide an internal space of the case into a section opening toward the housing and a section opening toward the end cover; a third chamber formed by closing the section opening toward the housing by the housing; and a fourth chamber formed by closing the section opening toward the end cover by the end cover. The generator and the first wrapping transmission mechanism may be held in the fourth chamber, and the motor and the second wrapping transmission mechanism may be held in the third chamber.

In a non-limiting embodiment, the generator may include a first rotor shaft that is rotatably supported at both ends in an axial direction, the motor may include a second rotor shaft that is supported rotatably at both ends in the axial direction, the first driven sheave may be mounted on the first rotor shaft between the end portions supported rotatably, and the second driven sheave may be mounted on the second rotor shaft between the end portions supported rotatably.

In a non-limiting embodiment, the series hybrid drive unit may further comprise: a case; a housing attached to a first end of the case; an end cover attached to a second end of the case; a first support member as a partition wall formed in the case in the housing side; a second support member as a partition wall formed in the case in the end cover side; a first chamber formed between the first support member and the second support member to hold the generator and the motor therein; a fifth chamber formed between the first support member and the housing to hold the second wrapping transmission mechanism and the final reduction unit; a sixth chamber formed between the second support member and the end cover to hold the first wrapping transmission mechanism; and a first bearing that rotatably supports the first drive sheave. The first bearing may be installed in the second support member.

In a non-limiting embodiment, the series hybrid drive unit may further comprise a gear mechanism that transmits a torque from the second wrapping transmission mechanism to the final reduction unit. The gear mechanism may include a drive gear that is rotated integrally with the second driven sheave, the final reduction unit may include a ring gear meshing with the drive gear, and the drive gear and the ring gear may include a double helical gear.

In a non-limiting embodiment, the series hybrid drive unit may further comprise a clutch device that selectively connects the input member to the motor.

In a non-limiting embodiment, the series hybrid drive unit may further comprise: a case; a housing attached to a first end of the case; and an end cover attached to a second end of the case. The generator, the motor, the second wrapping transmission mechanism, and the final reduction unit may be held in a chamber formed by the case, the housing, and the end cover. The input member and the first wrapping transmission mechanism may be disposed outside of the chamber while being adjacent to the housing.

In a non-limiting embodiment, the first wrapping transmission mechanism may include a belt-driven transmission mechanism.

In a non-limiting embodiment, the second driven sheave may be arranged coaxially with the generator.

Thus, according to the embodiment of the present disclosure, the generator and the motor are arranged parallel to each other while keeping a predetermined clearance. The engine torque is delivered to the generator through the first wrapping transmission mechanism, and the motor torque is delivered to the final reduction unit through the second wrapping transmission mechanism. According to the embodiment of the present disclosure, therefore, an axial distance between the input member and the generator, and an axial distance between the motor and the member rotated by the motor can be maintained sufficiently. For this reason, unlike a conventional gear unit, speed increasing ratios of the first wrapping transmission mechanism and the second wrapping transmission mechanism can be increased without using an intermediate rotary member such as an idle gear. Further, number of parts can be reduced to reduce a size and a weight of the hybrid drive unit. In addition, a power loss of the wrapping transmission mechanism is smaller than a power loss of the gear unit, and no thrust is created during torque transmission through the wrapping transmission mechanism. For this reason, structures of bearings can be simplified and hence a power transmission efficiency of the hybrid drive unit can be improved.

According to the embodiment of the present disclosure, since the input member is arranged coaxially with the motor, number of shafts arranged parallel to one another can be reduced less than four shafts. According to the embodiment of the present disclosure, therefore, the hybrid drive unit can be downsized.

According to the embodiment of the present disclosure, interference among the sheaves and the transmission members can be avoided by arranging the first wrapping transmission mechanism and the second wrapping transmission mechanism on both sides of the generator and the motor. According to the embodiment of the present disclosure, therefore, flexibility in arrangement of the first wrapping transmission mechanism and the second wrapping transmission mechanism, as well as flexibility in a contour or an outer shape of the hybrid drive unit can be increased.

According to the embodiment of the present disclosure, the first wrapping transmission mechanism and the second wrapping transmission mechanism may also be disposed on one side of the generator and the motor. In this case, the first wrapping transmission mechanism and the second wrapping transmission mechanism may be assembled simultaneously in the hybrid drive unit. For this reason, the hybrid drive unit may be assembled easily. In addition, since the first wrapping transmission mechanism and the second wrapping transmission mechanism are disposed on the same side, the hybrid drive unit may be downsized. Further, it is possible to prevent leakage of noise of the wrapping transmission mechanism by arranging the wrapping transmission mechanism closer to the engine than the generator and the motor. Furthermore, the wrapping transmission mechanism can be lubricated easily.

According to the embodiment of the present disclosure, the wrapping transmission mechanisms, and the generator and the motor may also be arranged in different chambers. In this case, assemble work in one of the chambers is carried out after the completion of assemble work in the other chamber. For this reason, the hybrid drive unit may be assembled easily.

According to the embodiment of the present disclosure, the generator, the motor, and the wrapping transmission mechanisms may also be held in the chambers formed of the case, the housing, and the end cover. In this case, specifically, the generator and the first wrapping transmission mechanism are held in a fourth chamber formed of a part of the case and the end cover, and the motor and the second wrapping transmission mechanism are held in in a third chamber formed of another part of the case and the housing. In this case, therefore, number of the chambers and bulkheads may be reduced and hence the structure of the hybrid drive unit may be simplified.

According to the embodiment of the present disclosure, support stiffness to support the rotor shaft may be enhanced by arranging the drive sheave and the driven sheave between the end portions of the rotor shaft supported rotatably. Consequently, structures of the bearings and the rotor shaft may be simplified and hence damages on the bearings and the rotor shaft may be limited.

According to the embodiment of the present disclosure, in the case closed by the end cover, transmission of vibrations of the first wrapping transmission mechanism to the end cover can be prevented by installing the bearings for supporting the shaft in the support member forming the chamber together with the end cover. In this case, so-called "membrane oscillation" of the end cover can be suppressed to further reduce the noise of the hybrid drive unit.

According to the embodiment of the present disclosure, the torque may be transmitted to the final reduction unit through the gear mechanism. Since the double helical gears are used as a gear pair in the gear mechanism, no thrust is created in the gear mechanism. In addition, structures of the bearings and the case in which the bearings are installed may be simplified to downsize the hybrid drive unit.

According to the embodiment of the present disclosure, the hybrid drive unit may be provided with a clutch device to selectively connect the input member to the motor. In this case, an output torque of the engine may be delivered to the final reduction unit without translating into an electric power. For this reason, running performance of the hybrid drive unit may be enhanced.

According to the embodiment of the present disclosure, the input member and the first wrapping transmission mechanism may be arranged outside of the housing. In this case, a member integrated with the first drive sheave may serve as the input member, and the input member may be connected to the engine. For these reasons, the first wrapping transmission mechanism may serve as a damper to absorb torque pulse, and hence the structure of the hybrid drive unit cam be simplified to further downsize the hybrid drive unit. In this case, a belt-driven transmission which is not necessary to be lubricated may be used as the first wrapping transmission mechanism.

According to the embodiment of the present disclosure, the second driven sheave may be arranged coaxially with the generator that is driven through the first wrapping transmission mechanism. According to the embodiment of the present disclosure, therefore, number of shafts arranged parallel to one another can be reduced and hence the structure of the hybrid drive unit can be simplified. For this reason, the hybrid drive unit can be downsized.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
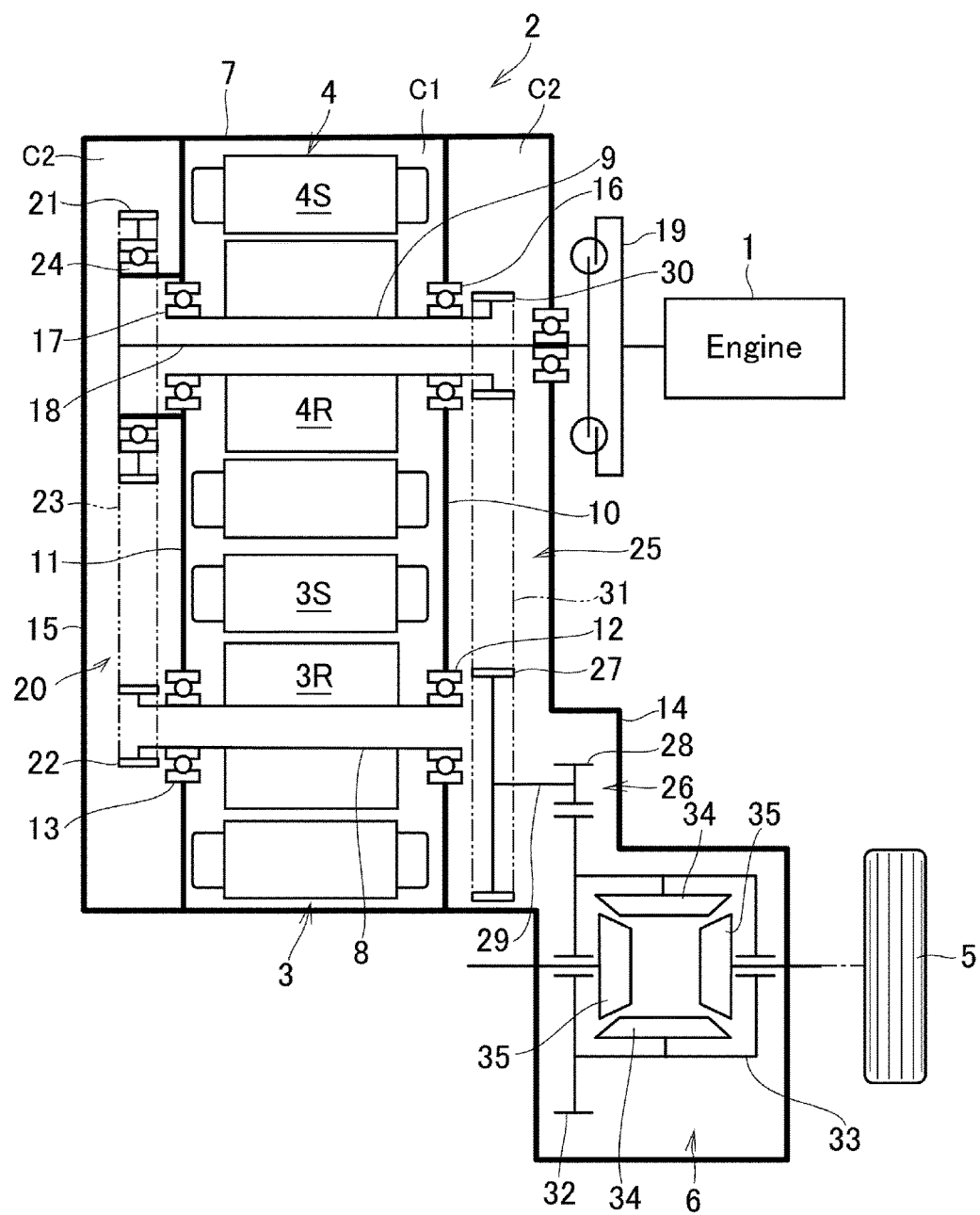
FIG. 1 is a schematic illustration showing a first embodiment of the present disclosure.

Embodiments of the present disclosure will now be explained with reference to the accompanying drawings. Turning now to FIG. 1, there is shown a first embodiment of a transaxle 2 according to the present disclosure that is adapted to be applied to a vehicle in which an engine 1 as a prime mover is mounted transversely. The transaxle 2 comprises a generator (or a motor-generator) 3 that is driven by the engine 1 to generate an electric power, a motor (or a motor-generator) 4 that is driven by the electric power generated by the generator 3, and a final reduction unit (i.e., a differential gear unit) that distributes an output torque of the motor 4.

The generator 3 and the motor 4 are held in a case 7 in such a manner that a rotor shaft 8 as a rotational center axis of the generator 3 and a rotor shaft 9 as a rotational center axis of the motor 4 extends parallel to each other while keeping a predetermined clearance therebetween. In the generator 3, a rotor 3R having a permanent magnet (not shown) is inserted into a stator 3S having a coil (not shown) in a rotatable manner, and the rotor shaft 8 is inserted fixedly into the rotor 3R. Accordingly, the rotor shaft 8 serves as a first rotor shaft of the embodiments. The case 7 comprises a front support 10 and a center support 11 as partition walls (or bulkheads). The front support 10 as a first support member of the embodiments and the center support 11 as a second support member of the embodiments are arranged on both sides of the generator 3 and the motor 4 to form a chamber C1. The chamber C1 between the front support 10 and the center support 11 serves as a first chamber of the embodiments. The rotor shaft 8 is supported rotatably by a bearing 12 installed in the front support 10 and a bearing 13 installed in the center support 11.

Any one of the front support 10 and the center support 11 is formed integrally with the case 7, and the other one of the front support 10 and the center support 11 is attached to the case 7 by a bolt or the like. A housing 14 is joined to a first end of the case 7 to close an opening of the front support 10 side, and an end cover (or a chain case) 15 is attached to a second end of the case 7 to close an opening of the center support 11 side.

In the motor 4, a rotor 4R having a permanent magnet (not shown) is inserted into a stator 4S having a coil (not shown) in a rotatable manner, and the rotor shaft 9 is inserted fixedly into the rotor 4R. Accordingly, the rotor shaft 9 serves as a second rotor shaft of the embodiments. One of end portions of the rotor shaft 9 penetrates through the front support 10 while being supported rotatably by a bearing 16 installed in the front support 10, and other end portion of the rotor shaft 9 penetrates through the center support 11 while being supported rotatably by a bearing 17 installed in the center support 11. For example, a permanent magnet motor, a synchronous motor without having a permanent magnet, and an induction motor may be adopted as the motor 4.

The rotor shaft 9 of the motor 4 is a hollow cylindrical shaft, and an input shaft 18 penetrates through the rotor shaft 9 to deliver a torque of the engine 1 to the generator 3. One of end portions (i.e., an input end) of the input shaft 18 penetrating through the housing 14 toward the engine 1 may be supported rotatably by a bearing (not shown), and the other end of the input shaft 18 protrudes from the rotor shaft 9.

The input end of the input shaft 18 is coupled to a damper 19 that absorbs a pulsation of the output torque of the engine 1, and the damper 19 is connected to an output shaft or a crank shaft (not shown) of the engine 1. For example, a conventional spring damper and a dynamic damper may be adopted as the damper 19. Optionally, an appropriate transmission device may be interposed between the input shaft 18 and the damper 19, and between the damper 19 and the engine 1. In the first embodiment shown in FIG. 1, the input shaft 18 and the damper 19 serve as an input member or an input mechanism.

The other end of the input shaft 18 and a left end (i.e., an output end) of the rotor shaft 8 of the generator 3 protrudes respectively into the end cover 15. In the end cover 15, the input shaft 18 and the rotor shaft 8 are connected to each other through a chain drive unit 20 as a first wrapping transmission mechanism. The chain drive unit 20 comprises: a drive sprocket 21 as a first drive sheave mounted on the other end of the input shaft 18; a driven sprocket 22 as a first driven sheave mounted on the output end of the rotor shaft 8, and an endless silent chain (as will be simply called the "chain" hereinafter) 23 as a first transmission member applied to the drive sprocket 21 and the driven sprocket 22. An outer diameter of the drive sprocket 21 is larger than an outer diameter of the driven sprocket 22. In other words, teeth number of the drive sprocket 21 is larger than teeth number of the driven sprocket 22. That is, the chain drive unit 20 serves as a speed increasing mechanism. Thus, in the first embodiment shown in FIG. 1, the chain drive unit 20 is arranged in the end cover 15, that is, in a chamber C2 between the end cover 15 and the center support 11. The chamber C2 serves as a second chamber or a sixth chamber of the embodiments.

In the first embodiment shown in FIG. 1, the drive sprocket 21 is supported rotatably by a bearing 24 as a first bearing installed in the center support 11. The bearing 24 may also be installed in the end cover 15. Instead, the drive sprocket 21 may also be integrated with the input shaft 18 and supported rotatably by a bearing interposed between an inner circumferential face of the rotor shaft 9 and an outer circumferential face of the input shaft 18.

In order to transmit an output torque of the motor 4 to the differential gear unit 6, a chain drive unit 25 as a second wrapping transmission mechanism is arranged in an opposite side to the chain drive unit 20 across the generator 3 and the motor 4. In the first embodiment shown in FIG. 1, the chain drive unit 25 is arranged in the housing 14, that is, in the chamber C2 between the housing 14 and the front support 10. The chamber C2 also serves as a second chamber or a fifth chamber of the embodiments. The chain drive unit 25 is connected to the differential gear unit 6 through a reduction gear mechanism 26 as a gear mechanism of the embodiments. The reduction gear mechanism 26 comprises a countershaft 29 extending parallel to the rotor shaft 9 of the motor 4, a driven sprocket 27 as a second driven sheave mounted on one end of the countershaft 29, and a counter drive gear 28 mounted on the other end of the countershaft 29. Specifically, the driven sprocket 27 is mounted on a left end of the countershaft 29 to be situated radially outer side of an end portion of the rotor shaft 9 in the engine 1 side, and a drive sprocket 30 as a second drive sheave is mounted on the end portion of the rotor shaft 9 in the engine 1 side. An endless silent chain (as will be simply called the "chain" hereinafter) 31 as a second transmission member is applied to the drive sprocket 30 and the driven sprocket 27.

The counter drive gear 28 meshes with a ring gear 32 of the differential gear unit 6 so that the output torque of the motor 4 is transmitted to the differential gear unit 6 through the chain drive unit 25 and the reduction gear mechanism 26. The differential gear unit 6 comprises: a differential carrier 33 to which the ring gear 32 is attached; a pair of pinion gears 34 as bevel gears held in the differential carrier 33; and a pair of side gears 35 as bevel gears also held in the differential carrier 33 while meshing with the pinion gears 34 respectively. The side gears 35 are connected to drive wheels 5 respectively. The differential gear unit 6 is held in the housing 14 in such a manner that rotational center axes of the side gears 35 extend parallel to the rotational center axes of the generator 3 and the motor 4.

Figure 2:
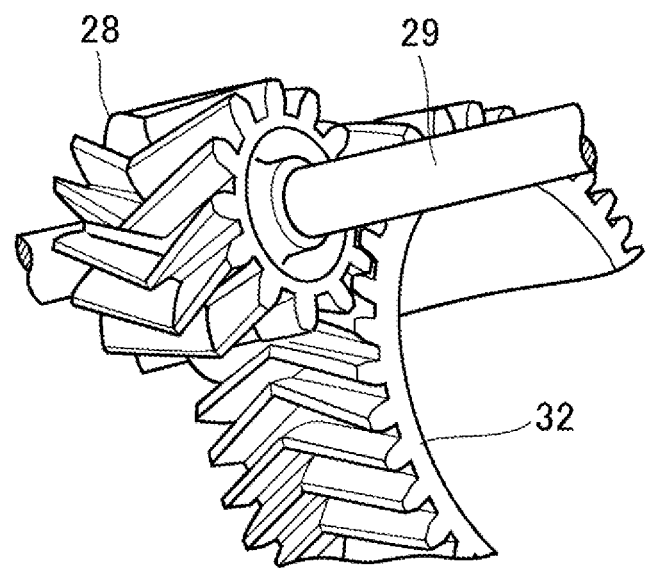
FIG. 2 is a perspective view showing one example of a pair of double helical gears.

As illustrated in FIG. 2, a double helical gear is adopted as the counter drive gear 28 and the ring gear 32 of the differential gear unit 6 respectively. During torque transmission between the counter drive gear 28 and the ring gear 32, a contact point between gear teeth recedes from a width center to both width ends. Therefore, noise can be reduced and no thrust is created.

Although not especially shown in FIG. 1, the countershaft 29 is supported rotatably by a bearing installed in the front support 10 and a bearing installed in the housing 14. As described, thrust is not created during torque transmission between the counter drive gear 28 and the ring gear 32, and also during torque transmission through the chain drive unit 25. For this reason, a ball bearing adapted to receive a radial load may be used to support the countershaft 29.

Figure 3:
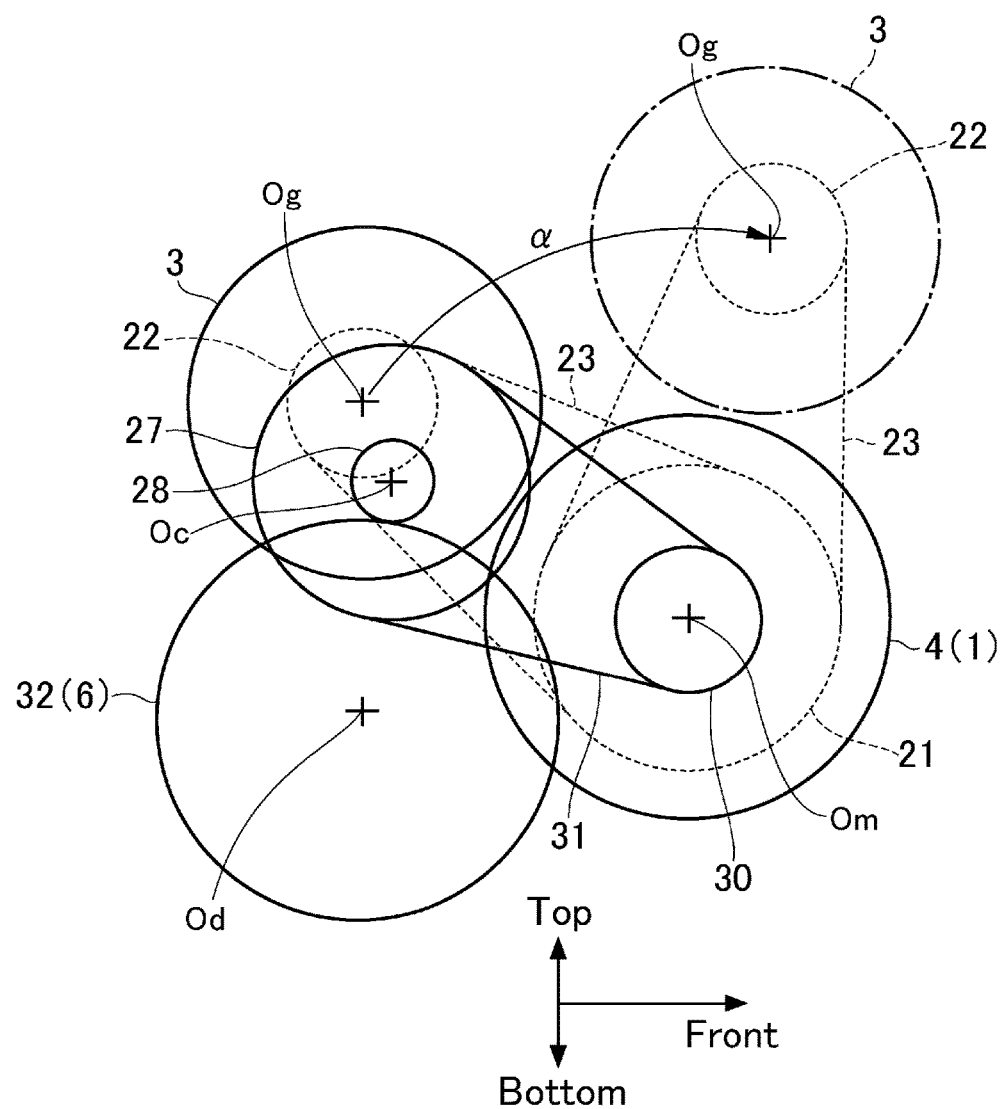
FIG. 3 is an explanatory drawing showing rotational center axes in the hybrid drive unit shown in FIG. 1.

Thus, the hybrid drive unit according to the first embodiment of the present disclosure is a multi-shaft drive unit in which the rotational center axis of the generator 3 and the rotational center axis of the motor 4 extend parallel to each other while keeping a predetermined clearance therebetween. In addition, a rotational center axis of the countershaft 29 and a rotational center axis of the differential gear unit 6 also extend parallel to the rotational center axes of the generator 3 and the motor 4. Specifically, the hybrid drive unit according to the embodiment of the present disclosure is a four-shaft drive unit. FIG. 3 shows relative positions of the rotational center axis Og of the generator 3, the rotational center axis Om of the motor 4, the rotational center axis Oc of the countershaft 29, and the rotational center axis Od of the differential gear unit 6 viewed from the axial direction of the transaxle 2. As illustrated by a pitch circle in FIG. 3, the differential gear unit 6 is situated at a lower level in the transaxle 2 so that an angle between the differential gear unit 6 and a driveshaft (not shown) is reduced as much as possible. The rotational center axis Oc of the countershaft 29 is situated substantially right above the rotational center axis Od of the differential gear unit 6. The motor 4 is situated in a front side of the vehicle so that the rotational center axis Om of the motor 4 is situated between the rotational center axis Od of the differential gear unit 6 and the rotational center axis Oc of the countershaft 29 in a vertical direction, and in front of the rotational center axis Od of the differential gear unit 6 and the rotational center axis Oc of the countershaft 29. Positions of the engine 1 and the damper 19 are governed by a structure of the vehicle. As described, the generator 3 is connected to the input shaft 18 through the chain drive unit 20. Therefore, the generator 3 is positioned in such a manner that the rotational center axis Og of the generator 3 is situated on an arc whose radius is a distance from the rotational center axis Om of the motor 4 governed by a structure of the chain drive unit 20. For this application, since the chain drive unit 20 and the chain drive unit 25 are situated on both sides of the generator 3 and the motor 4, number of members of the generator 3 and the chain drive unit 20 for driving the generator 3 that might cause interference with the motor 4 is small. In the transaxle 2, therefore, a position of the generator 3 may be selected within an angle "α" between a position at which the generator 3 causes interference with a member arranged at a lower level of the vehicle such as a driveshaft (not shown) and a position at which the generator 3 causes interference with a member arranged in the front section of the vehicle such as a radiator (not shown). Thus, according to the first embodiment, the generator 3 may be positioned considerably flexibly in the transaxle 2.

Figure 4:
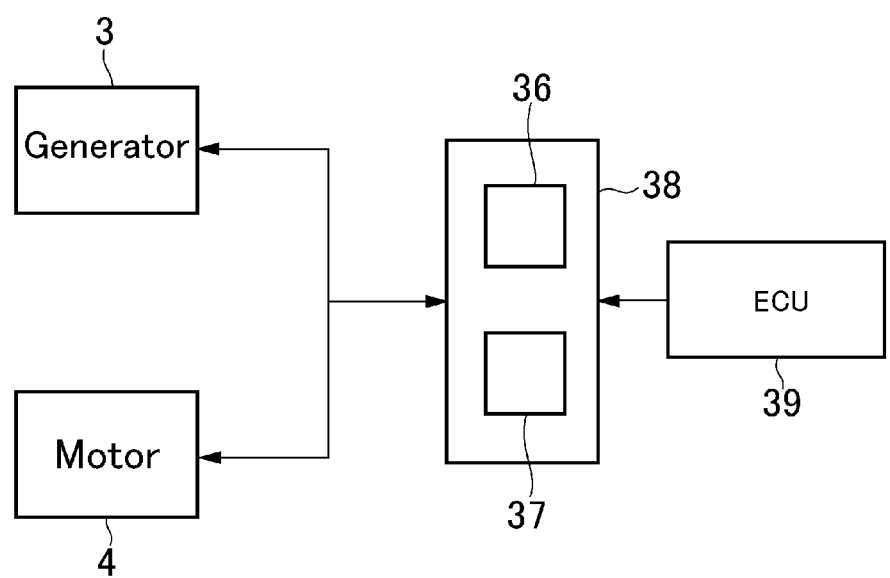
FIG. 4 is a block diagram showing a control system for the generator and the motor.

The hybrid drive unit according to the embodiment is so-called a "series hybrid drive unit" in which the generator is driven by the engine 1 to generate electricity, and the motor 4 is driven by the electricity generated by the generator 3 to generate a torque to propel the vehicle. The motor 4 is also operated as a generator to regenerate energy during deceleration of the vehicle. In order to control the generator 3 and the motor 4, as shown in FIG. 4, the generator 3 and the motor 4 are connected respectively to a controller 38 comprising a battery 36 and an inverter 37. The controller 38 is connected to an electronic control unit (referred to as "ECU" in FIG. 4) composed mainly of a microcomputer configured to execute a calculation based on incident data and stored data, and to transmit calculation result to the controller 38 in the form of command signal.

Next, an action of the hybrid drive unit according to the first embodiment will be explained hereinafter. An output torque of the engine 1 is delivered to the input shaft 18 via the damper 19. Due to intermittent combustion of gas/fuel mixture in the engine 1, pulsation of the output torque of the engine 1 is caused inevitably during operation of the engine 1. However, such pulsation of the output torque of the engine 1 is absorbed by the damper 19 so that vibrations on the input shaft 18 resulting from pulsation of the output torque of the engine 1 is reduced. The torque of the input shaft 18 is delivered to the rotor shaft 8 of the generator 3 so that the rotor 3R is rotated to generate electricity. Since the generator 3 and the motor 4 are arranged parallel to each other in the drive unit shown in FIG. 1, a distance between the rotational center axis Og of the generator 3 and the rotational center axis Om of the motor 4, that is, an axis distance between the drive sprocket 21 and the driven sprocket 22 can be maintained sufficiently. For this reason, a pitch circle diameter of the drive sprocket 21 can be increased sufficiently larger than a pitch circle diameter of the driven sprocket 22 thereby increasing a speed increasing ratio.

The electricity generated by the generator 3 is accumulated in the battery 36 or supplied to the motor 4. For example, when an accelerator pedal (not shown) is depressed, the electricity generated by the generator 3 is supplied to the motor 4 to generate a torque, and the torque generated by the motor 4 is delivered from the rotor shaft 9 to the reduction gear mechanism 26 through the chain drive unit 25. As described, since the generator 3 and the motor 4 are arranged parallel to each other, the distance between the rotational center axis Og of the generator 3 and the rotational center axis Om of the motor 4, that is, an axis distance between the drive sprocket 30 and the driven sprocket 27 may also be maintained sufficiently. For this reason, a pitch circle diameter of the drive sprocket 30 can be decreased sufficiently small than a pitch circle diameter of the driven sprocket 27 thereby increasing a speed reducing ratio.

In the reduction gear mechanism 26, the driven sprocket 27 and the counter drive gear 28 are mounted on the countershaft 29. The counter drive gear 28 meshes with the ring gear 32 of the differential gear unit 6, and a diameter of the counter drive gear 28 is smaller than a diameter of the ring gear 32. Therefore, the torque delivered from the motor 4 through the chain drive unit 25 to the differential gear unit 6 can be further multiplied to be delivered to the drive wheels 5. That is, a drive torque to propel the vehicle can be increased. In addition, since the motor 4 generates torque without pulsation, smooth propulsion of the vehicle can be ensured with reduced noise and vibration.

As described, a double helical gear is adopted as the counter drive gear 28 and the ring gear 32 of the differential gear unit 6 respectively. Therefore, noise and vibration can be reduced during torque transmission between the counter drive gear 28 and the ring gear 32, and no thrust is created. For this reason, a radial bearing such as a ball bearing may be used to support the countershaft 29. Since the thrust is also not created during torque transmission through chain drive unit 20 and the chain drive unit 25, the radial bearing may also be used to support the chain drive unit 20 and the chain drive unit 25. According to the first embodiment, therefore, a shaft supporting structure may be simplified while improving a power transmission efficiency. In addition, since the housing 14 and the case 7 supporting the countershaft 29 will not be deformed by the thrust force, oil leakage and misalignment will not be caused by such deformation of the housing 14 or the case 7. For this reason, weights of the housing 14 and the case 7 can be reduced. Thus, the hybrid drive unit according to the first embodiment can be downsized, and weight of the hybrid drive unit according to the first embodiment can be reduced. Further, since a bearing is not installed in the end cover 15, vibration of the chain drive unit 20 will not be transmitted directly to the end cover 15. In the hybrid drive unit according to the first embodiment, therefore, so-called "membrane oscillation" of the end cover 15 can be suppressed to further reduce the noise.

In addition, the transaxle 2 shown in FIG. 1 may be assembled easily by supporting the generator 3 and the motor 4 by the front support 10 and the center support 11 in the case 7, then assembling the chain drive unit 20 and the chain drive unit 25, and thereafter attaching the housing 14 and the end cover 15 to the case 7.

Figure 5:
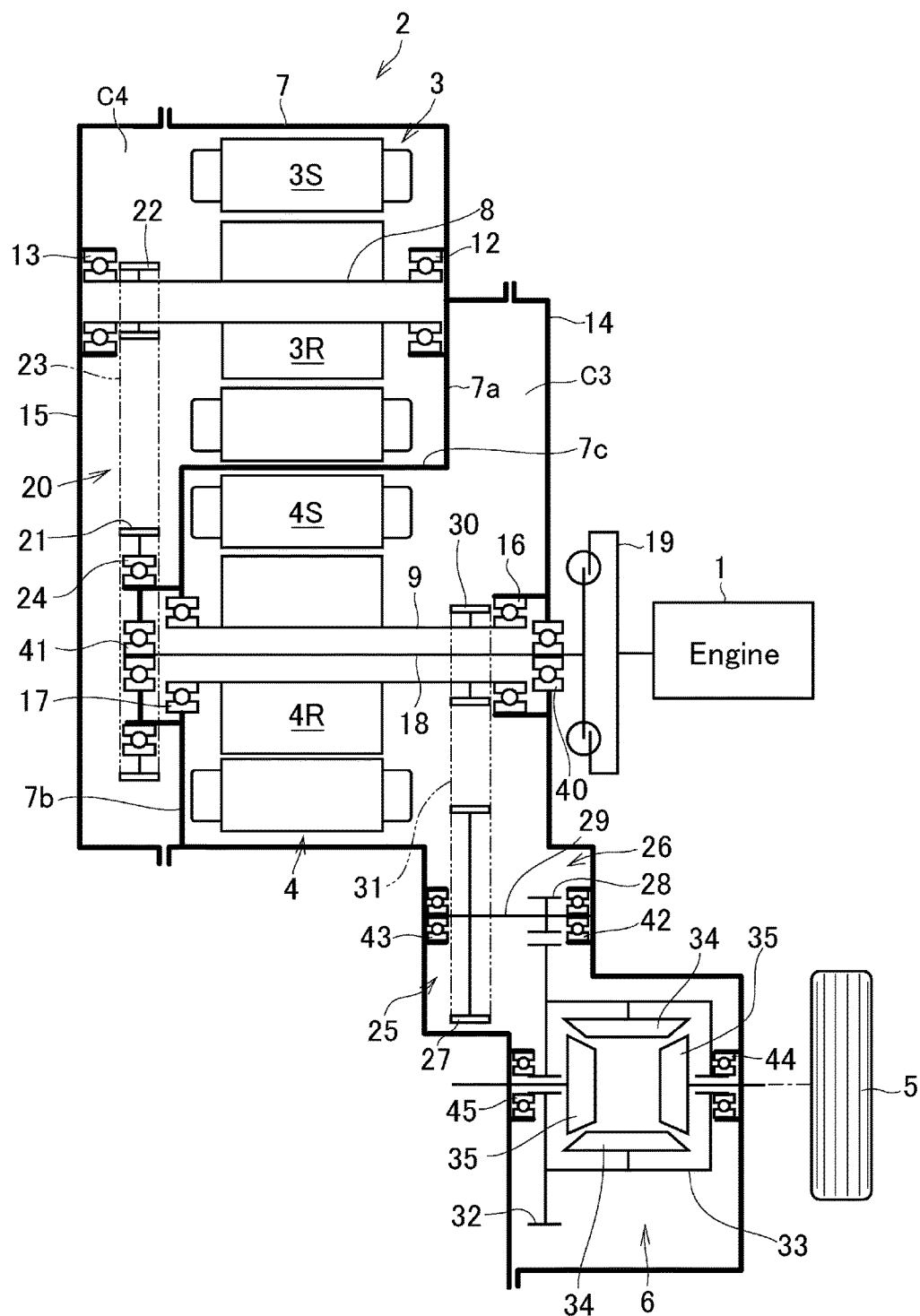
FIG. 5 is a schematic illustration showing a second embodiment of the present disclosure.

Turning to FIG. 5, there is shown the second embodiment of the hybrid drive unit in which the front support 10 and the center support 11 are not attached to the case 7 by the bolt. The hybrid drive unit shown in FIG. 5 is also a four-shaft type series hybrid drive unit. In FIG. 5, positions of the generator 3 and the motor 4 are switched from those in FIG. 1 for the sake of illustration.

In the transaxle 2 shown in FIG. 5, the case 7 comprises: a first longitudinal bulkhead 7a extending longitudinally between the generator 3 and the engine 1 to support one end of the generator 3; a second longitudinal bulkhead 7b extending longitudinally between the motor 4 and the end cover 15 to support one end of the motor 4; and a lateral bulkhead 7c extending laterally between the generator 3 and the motor 4 to connect the first longitudinal bulkhead 7a and the second longitudinal bulkhead 7b. That is, the lateral bulkhead 7c extends substantially parallel to the generator 3 and the motor 4 therebetween. It is not necessary to completely divide the generator 3 and the motor 4 by the lateral bulkhead 7c, and hence a through hole or the like may be formed in the lateral bulkhead 7c to provide communication between the generator 3 and the motor 4 as necessary.

Thus, in the transaxle 2 shown in FIG. 5, a chamber C4 as a fourth chamber opening toward the end cover 15 is formed by a portion of the case 7, the first longitudinal bulkhead 7a, and the lateral bulkhead 7c, and the generator 3 is held in the chamber C4. On the other hand, a chamber C3 as a third chamber opening toward the housing 14 is formed by another portion of the case 7, the second longitudinal bulkhead 7b, and the lateral bulkhead 7c, and the motor 4 is held in the chamber C3. One end of the rotor shaft 8 of the generator 3 is rotatably supported by the bearing 12 installed in an inner face of the first longitudinal bulkhead 7a, and other end of the rotor shaft 8 is rotatably supported by the bearing 13 installed in an inner face of the end cover 15. The driven sprocket 22 of the chain drive unit 20 is mounted on the rotor shaft 8 between the generator 3 and the bearing 13, and the drive sprocket 21 is rotatably supported by the bearing 24 installed in an outer face of the second longitudinal bulkhead 7b facing to the end cover 15.

One end of the rotor shaft 9 of the motor 4 is rotatably supported by the bearing 16 installed in an inner face of the housing 14, and other end of the rotor shaft 9 is rotatably supported by the bearing 17 installed in an inner face of the second longitudinal bulkhead 7b. The input shaft 18 penetrates through the rotor shaft 9, and one end of the input shaft 18 projecting to the end cover 15 is rotatably supported by a bearing 41 installed in an outer face of the second longitudinal bulkhead 7b facing to the end cover 15. The drive sprocket 21 is mounted on said one end of the input shaft 18 around the bearing 41. Other end of the input shaft 18 penetrates through the housing 14 while being supported rotatably by a bearing 40 installed in an outer face of the housing 14. The countershaft 29 is rotatably supported by a bearing 42 and a bearing 43, and the differential gear unit is rotatably supported by a bearing 44 and a bearing 45. The remaining structures of the drive unit shown in FIG. 5 are similar to those of the drive unit shown in FIG. 1, and detailed explanations for the common elements will be omitted by allotting common reference numerals thereto.

Thus, according to the second embodiment shown in FIG. 5, the front support 10 and the center support 11 can be omitted. According to the second embodiment, therefore, number of parts and a required man-hour can be reduced in addition to reduce a size and a weight of the drive unit.

Figure 6:
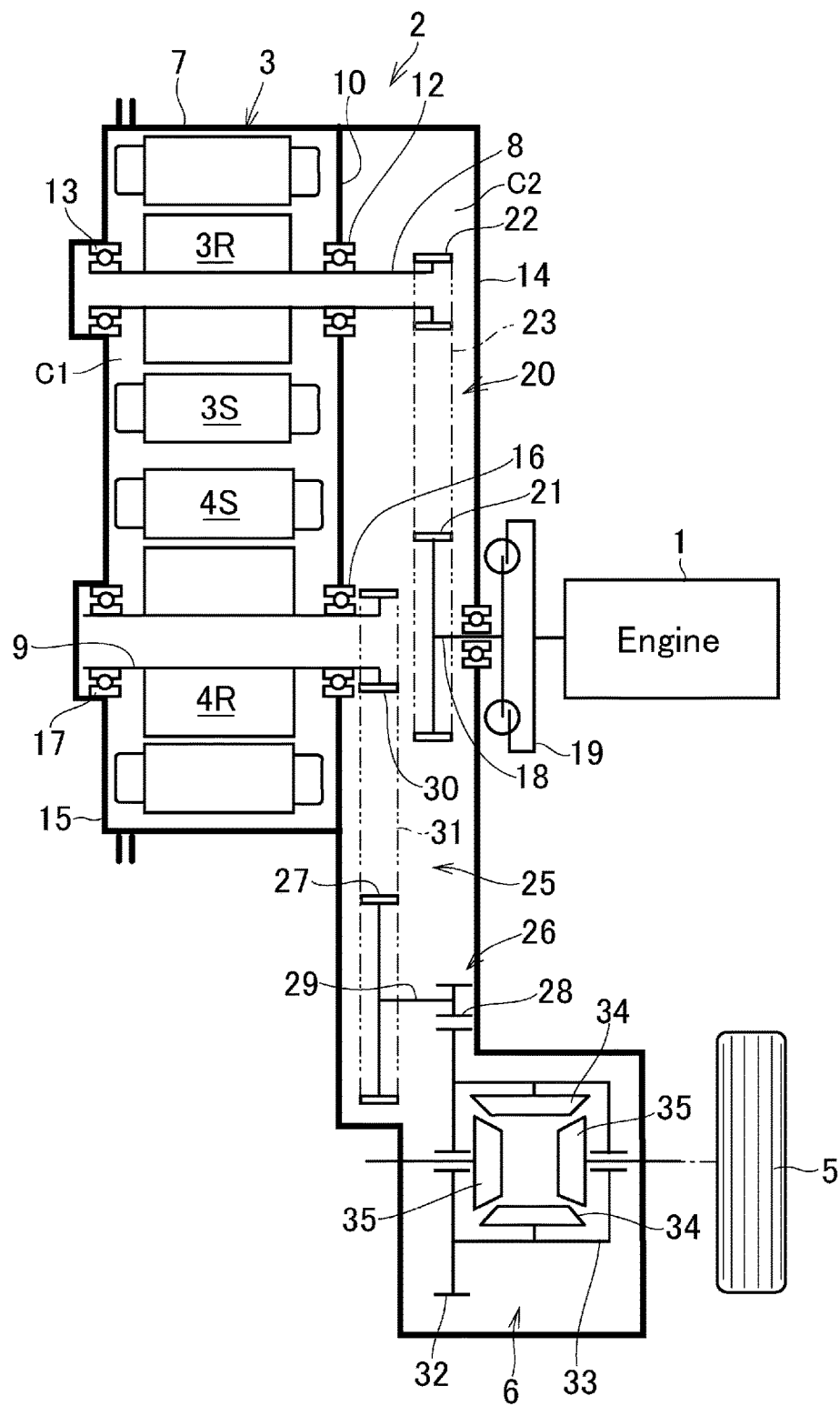
FIG. 6 is a schematic illustration showing a third embodiment of the present disclosure.

According to the third embodiment shown in FIG. 6, the chain drive unit 20 and the chain drive unit 25 may be arranged in a same chamber. In the following description, detailed explanation for the elements in common with those in the first and the second embodiments will be omitted by allotting common reference numerals thereto. In FIG. 6, the bearings supporting the countershaft 29 and the differential gear unit 6 are omitted.

In the transaxle 2 according to the third embodiment shown in FIG. 6, the center support 11 is not arranged in the case 7. In the case 7, therefore, one end of the rotor shaft 8 of the generator 3 and one end of the rotor shaft 9 of the motor 4 protrude respectively from the front support 10 toward the end cover 15. Specifically, one end of the rotor shaft 8 of the generator 3 projects into the housing 14 through the front support 10 while being supported rotatably by the bearing 12 installed in the front support 10, and other end of the rotor shaft 8 is rotatably supported by the bearing 13 installed in the end cover 15. The chain drive unit 20 is held in the chamber C2 between the front support 10 and the housing 14, and the driven sprocket 22 thereof is mounted on said one end of the rotor shaft 8.

On the other hand, one end of the rotor shaft 9 of the motor 4 projects into the housing 14 through the front support 10 while being supported rotatably by the bearing 16 installed in the front support 10, and other end of the rotor shaft 9 is rotatably supported by the bearing 17 installed in the end cover 15. The chain drive unit 25 is also held in the chamber C2 between the front support 10 and the housing 14, and the drive sprocket 30 thereof is mounted on said one end of the rotor shaft 9.

Figure 7:
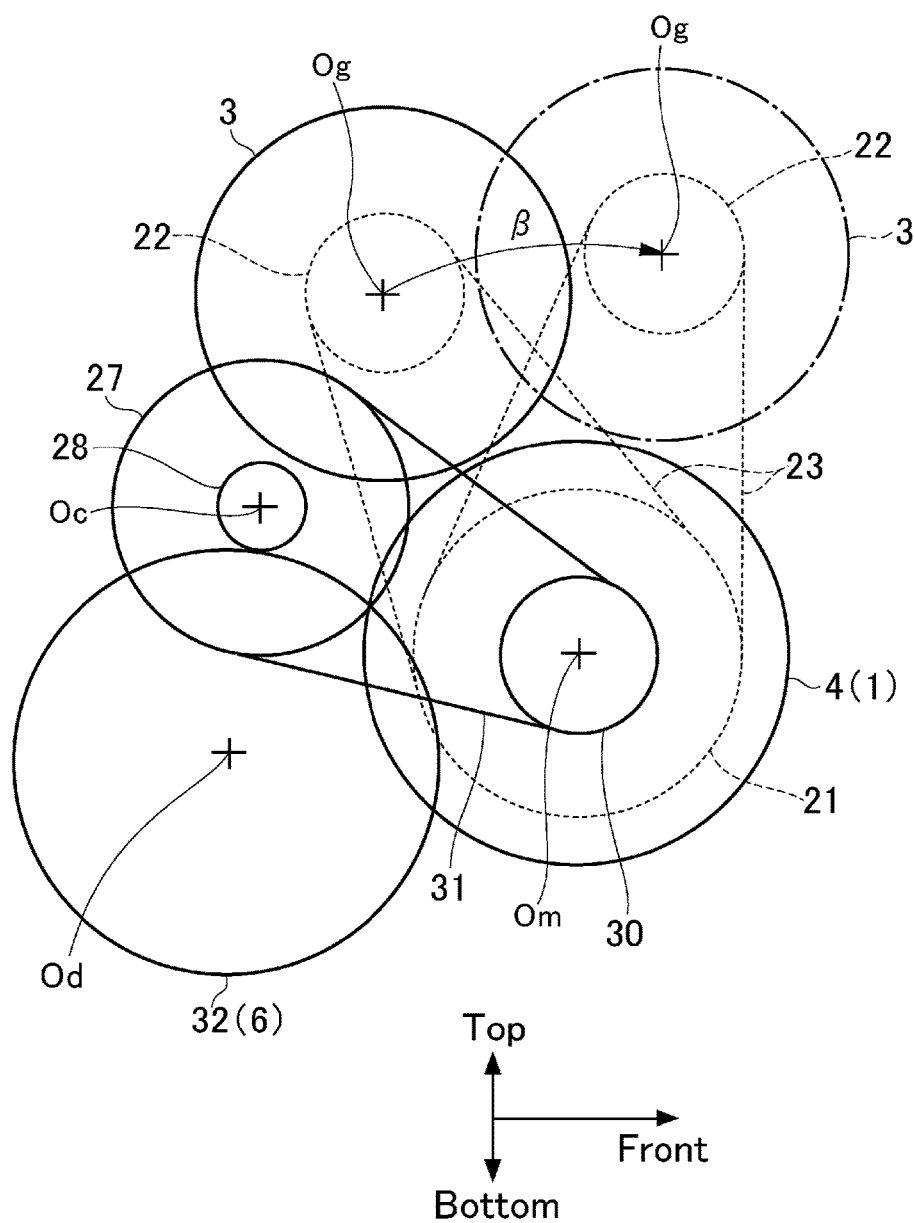
FIG. 7 is an explanatory drawing showing rotational center axes in the hybrid drive unit shown in FIG. 6.

FIG. 7 shows relative positions of the rotational center axis Og of the generator 3, the rotational center axis Om of the motor 4, the rotational center axis Oc of the countershaft 29, and the rotational center axis Od of the differential gear unit 6 in the drive unit shown in FIG. 6 viewed from the axial direction of the transaxle 2. According to the third embodiment, since the chain drive unit 20 and the chain drive unit 25 are held in the same chamber, the chains 23 and 31, and the sprockets 21, 22, 27, and 30 may cause interference with other members easier in comparison with the foregoing embodiments. According to the third embodiment, therefore, angle "β" shown in FIG. 7 in which the generator 3 may be positioned is narrower than the angle "α" shown in FIG. 3.

According to the third embodiment, the center support 11 may be omitted, therefore, number of parts and a required man-hour can be reduced in addition to reduce a size and a weight of the drive unit. In addition, since the chamber holding the generator 3 and the motor 4 and the chamber holding the chain drive unit 20 and the chain drive unit 25 are divided by the front support 10, an assemble work for the generator 3 and the motor 4, and an assemble work for the chain drive unit 20 and the chain drive unit 25 may be carried out separately. Further, since the chain drive unit 20 and the chain drive unit 25 are held in the same chamber, a structure of an oil passage for supplying oil to the chain drive unit 20 and the chain drive unit 25 may be simplified.

Figure 8:
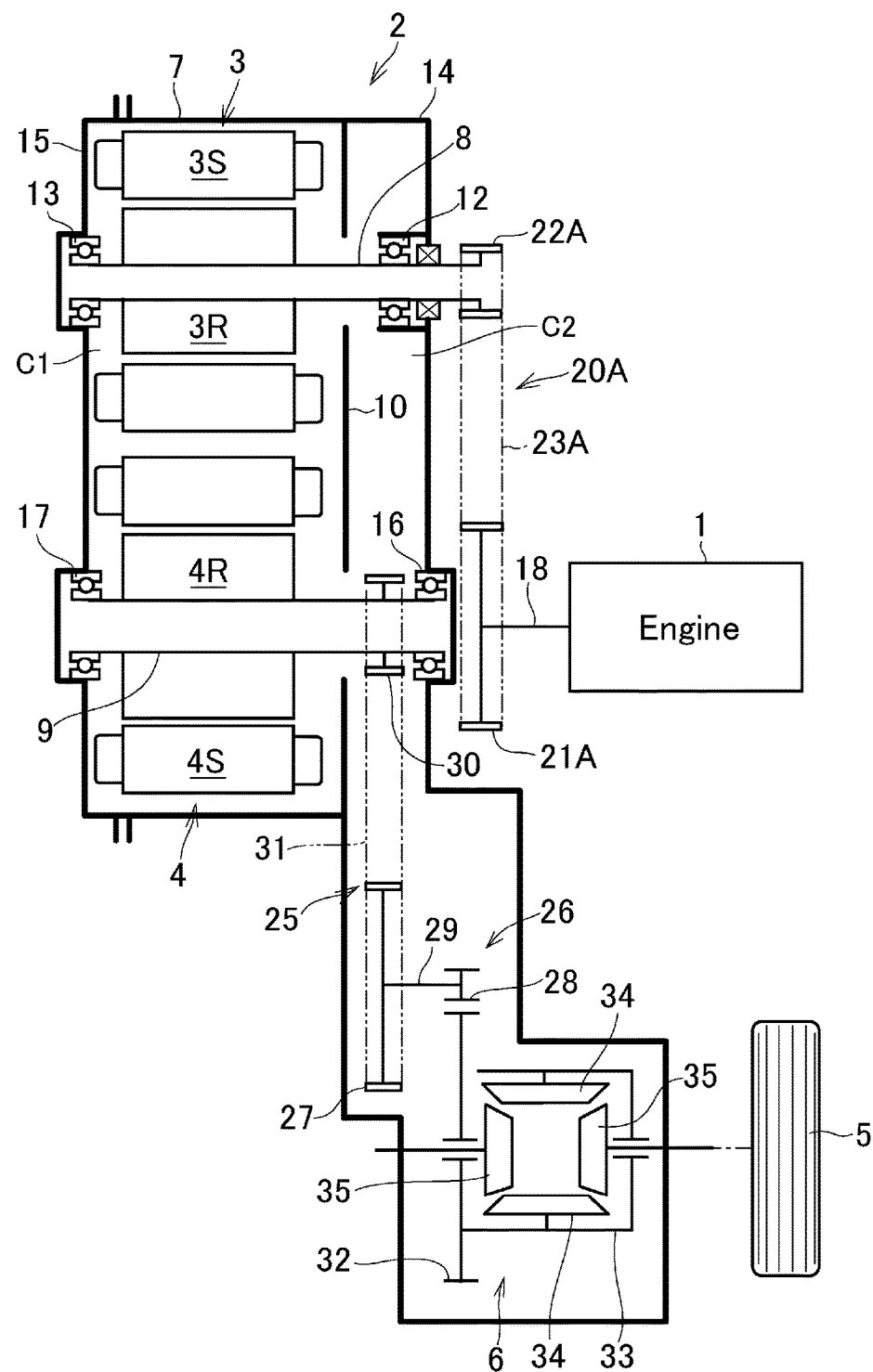
FIG. 8 is a schematic illustration showing a fourth embodiment of the present disclosure.

In the case of arranging both of the chain drive unit 20 and the chain drive unit 25 in the engine 1 side as shown in FIG. 6, one of the wrapping transmission mechanisms for transmitting the torque of the engine 1 to the generator 3 may be arranged outside of the housing 14. FIG. 8 shows the fourth embodiment of the hybrid drive unit in which one of the wrapping transmission mechanisms is arranged outside of the housing 14. In this case, it is difficult to lubricate the wrapping transmission arranged outside of the housing 14 or the chamber C2. In the fourth embodiment, therefore, it is preferable to employ a transmission in which metal members are not contacted to each other. In other words, it is preferable to use a transmission which is not required to be lubricated. In the fourth embodiment, specifically, a belt-driven transmission 20A is employed to transmit the torque of the engine 1 to the generator 3. In the following description, detailed explanation for the elements in common with those in the third embodiment will be omitted by allotting common reference numerals thereto. In the transaxle 2 shown in FIG. 8, one end of the rotor shaft 8 of the generator 3 protrudes from the housing 14, and a driven pulley 22A is mounted on said one end of the rotor shaft 8. A drive pulley 21A is arranged parallel to the driven pulley 22A, and the output shaft (or the crankshaft) of the engine 1 is connected to the drive pulley 21A. The drive pulley 21A may be supported rotatably by a bearing (not shown) installed in the housing 14, or by a bearing installed in a member (not shown) for connecting the engine 1 to the housing 14.

In the belt-driven transmission 20A, a belt 23A is applied to the drive pulley 21A and driven pulley 22A. Since the belt 23A may be buckled flexibly, the pulsation of the engine torque may be absorbed by such flexibility of the belt 23. According to the fourth embodiment, therefore, the damper 19 may be omitted to further reduce a size and a weight of the drive unit. In the fourth embodiment, the drive pulley 21A and a rotary member such as a shaft integrated with the drive pulley 21A serve as an input member.

In the third embodiment shown in FIG. 6, the driven sprocket 22 mounted on one end of the rotor shaft 8 of the generator 3 and the drive sprocket 30 mounter on one end of the rotor shaft 9 of the motor 4 are cantilevered. This is disadvantageous to ensure support stiffness, to limit damages on the rotor shafts 8 and 9, and to reduce noise and vibration. In order to avoid such disadvantages, in the fifth embodiment, the driven sprocket 22 and the drive sprocket 30 are individually supported at both sides. In the following description, detailed explanation for the elements in common with those in the third embodiment will be omitted by allotting common reference numerals thereto.

Figure 9:
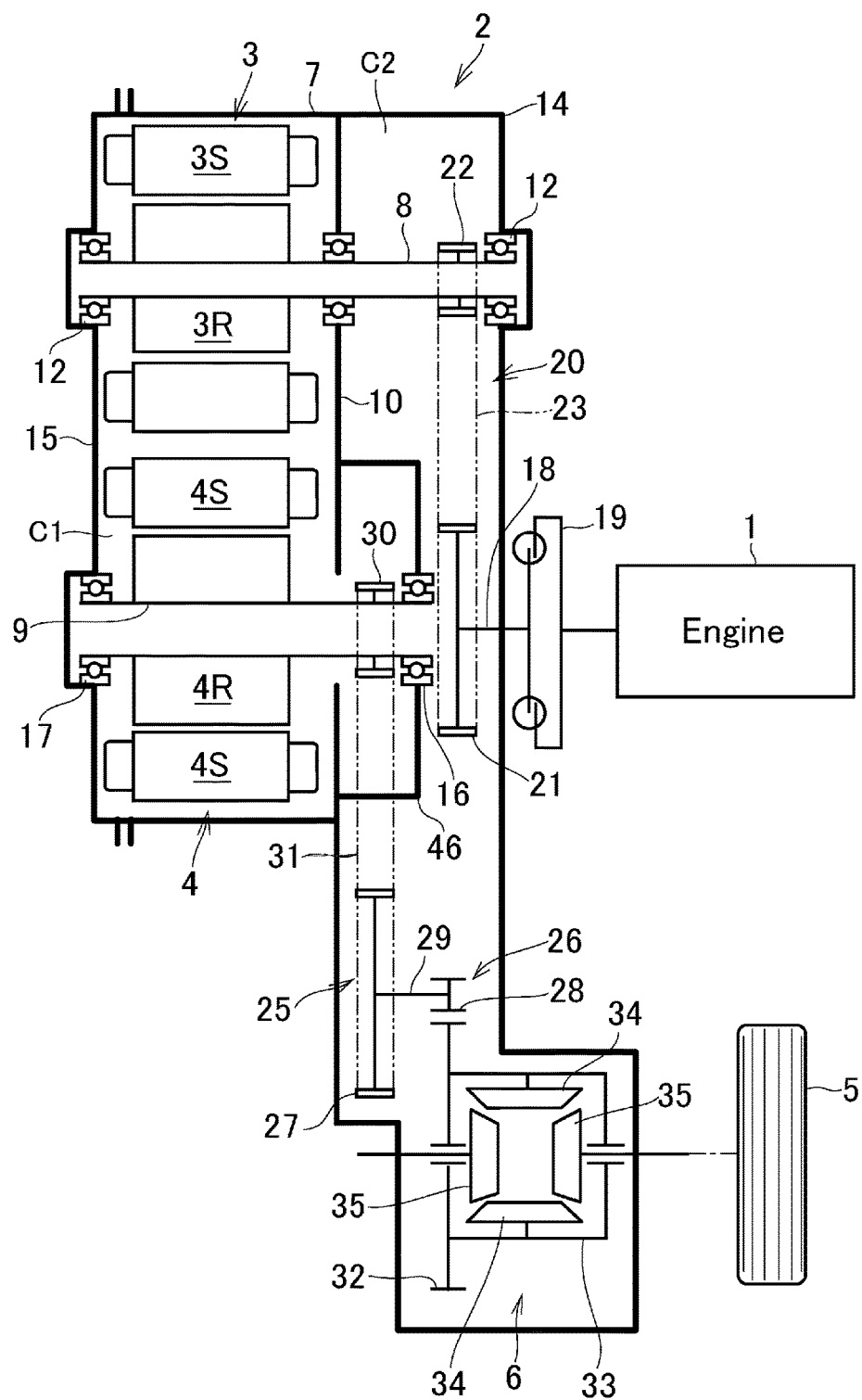
FIG. 9 is a schematic illustration showing a fifth embodiment of the present disclosure.

In the transaxle shown in FIG. 9, one end the rotor shaft 8 of the generator 3 extends to the housing 14 through the front support 10, and rotatably supported by the bearing 12 installed in the housing 14. The driven sprocket 22 is mounted on the rotor shaft 8 between the rotor 3R of the generator 3 and the bearing 12.

One end of the rotor shaft 9 of the motor 4 projects into the housing 14 through the front support 10. In the fifth embodiment, specifically, a retainer 46 projecting toward the housing 14 is formed integrally with the front support 10, and said one end of the rotor shaft 9 is rotatably supported by the bearing 16 installed in the retainer 46. The drive sprocket 30 is mounted on the rotor shaft 9 between the rotor 4R of the motor 4 and the bearing 16. The retainer 46 opens toward the driven sprocket 27, and the chain 31 is applied to the drive sprocket 30 and the driven sprocket 27 through the opening of the retainer 46.

Figure 10:
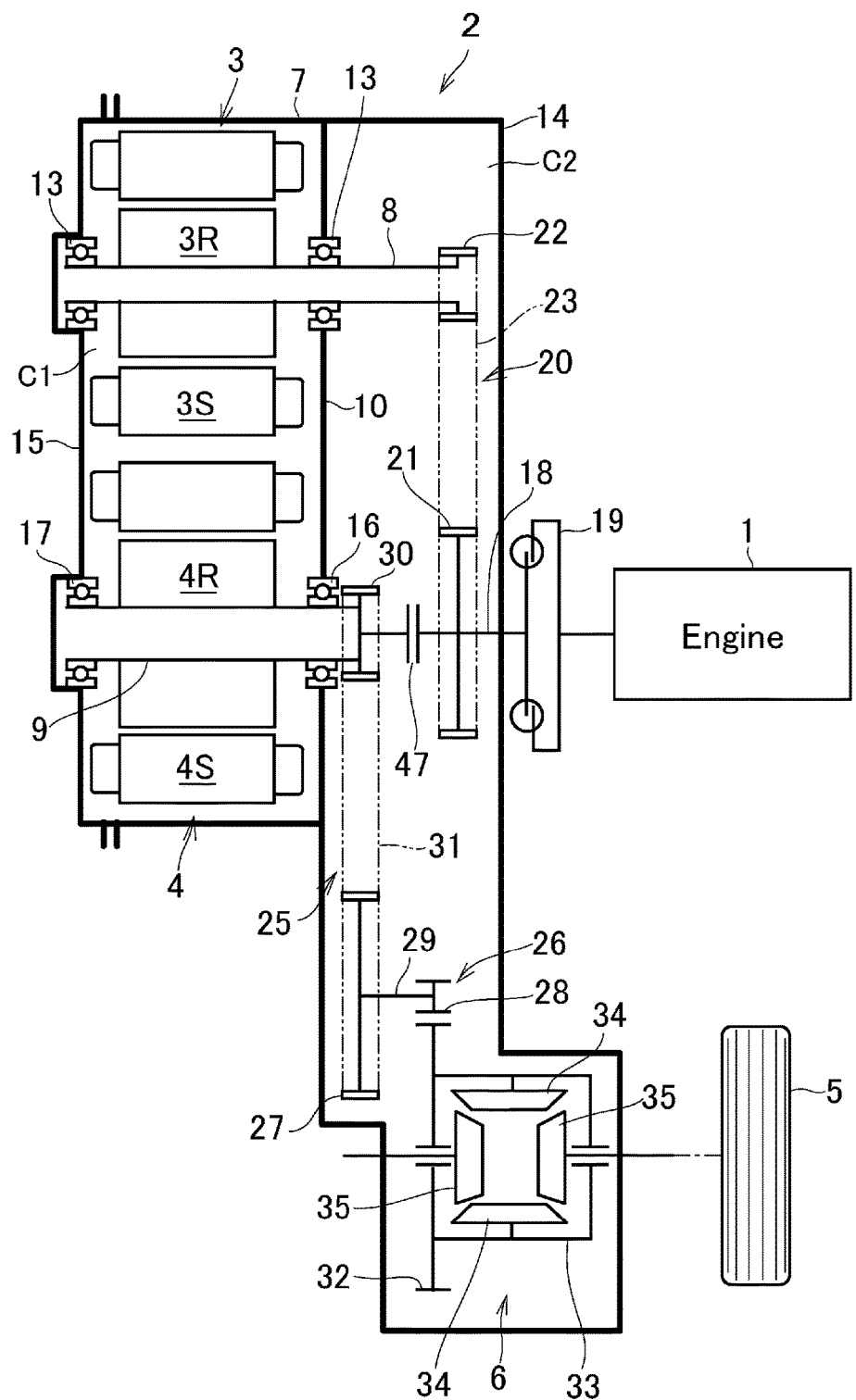
FIG. 10 is a schematic illustration showing a sixth embodiment of the present disclosure.

In the four-shaft drive unit drive unit according to the embodiment, the input member to which the torque of the engine 1 is applied and the rotor shaft 9 of the motor 4 are arranged coaxially. According to the sixth embodiment shown in FIG. 10, the transaxle 2 is provided with a clutch device 47 to selectively connect and disconnect the input member to/from the rotor shaft 9 so that the output power of the engine 1 can be delivered to the drive wheels 5 without translating into an electric power by engaging the clutch device 47. In the following description, detailed explanation for the elements in common with those in the third embodiment will be omitted by allotting common reference numerals thereto. In the transaxle 2 shown in FIG. 10, specifically, the rotor shaft 9 of the motor 4 and the drive sprocket 21 are arranged coaxially, and the clutch device 47 is interposed between the rotor shaft 9 and the drive sprocket 21. For example, a friction clutch and a dog clutch may be adopted as the clutch device 47, and the clutch device 47 may be adapted to be operated not only hydraulically or electromagnetically, but also manually.

When the clutch device 47 is disengaged, the vehicle may be propelled in so-called "series hybrid mode" in which the generator 3 is driven by the engine 1 to generate electricity, and the motor 4 is operated by the electricity generated by the generator 3 to generate torque to propel the vehicle. By contrast, when the clutch device 47 is engaged, the vehicle may be propelled in so-called "engine mode" in which an output torque of the engine 1 is delivered to the drive wheels 5 through the clutch device 47, the chain drive unit 25, and the differential gear unit 6. In the engine mode, a large drive torque can be generated even in a high speed range. In addition, since the torque of the engine 1 will not be translated into an electric power, fuel efficiency can be improved in the high speed range. In the engine mode, the generator 3 is also driven and hence the battery 36 may be charged with the electricity generated by the generator 3. Further, in the engine mode, the motor 4 may also be operated by the electricity supplied from the battery 36 to generate torque to propel the vehicle together with the output torque of the engine 1.

Figure 11:
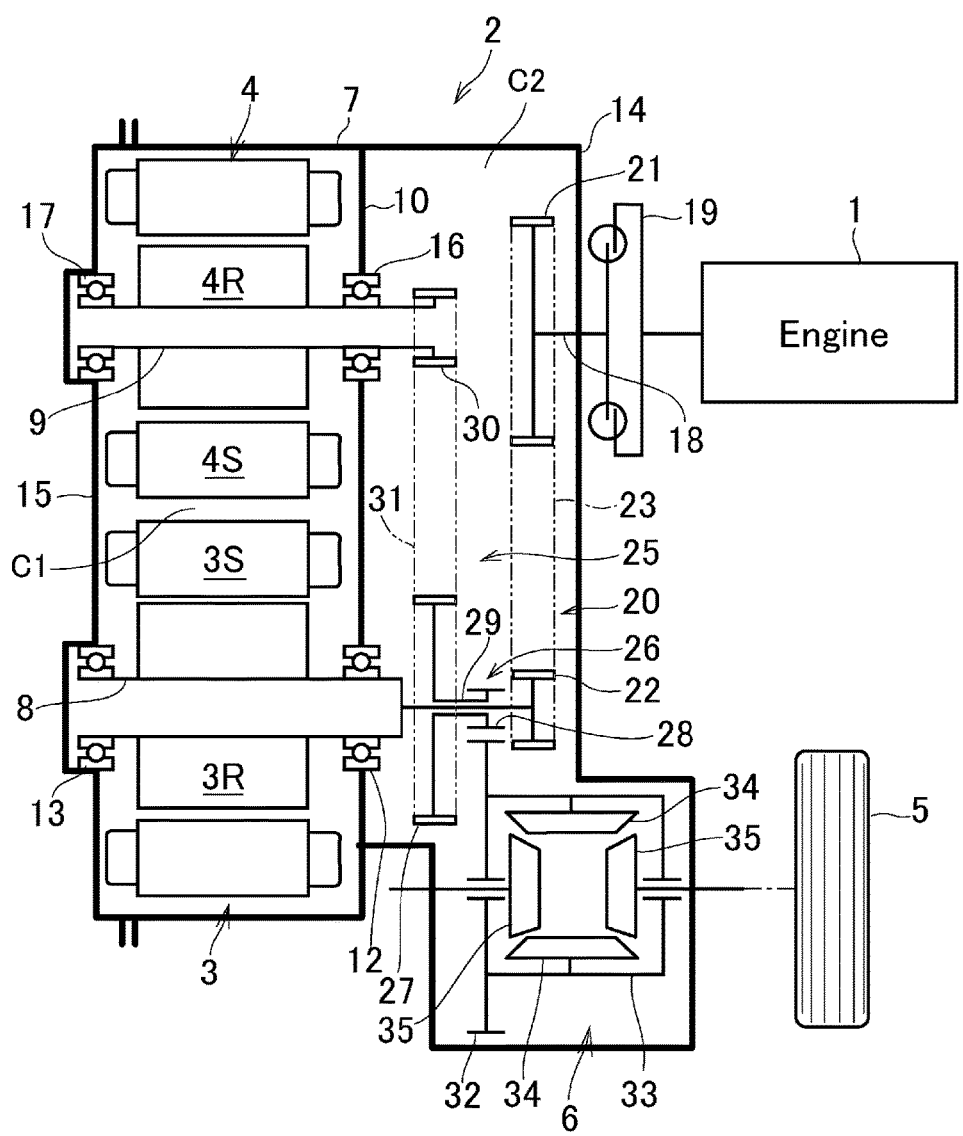
FIG. 11 is a schematic illustration showing a seventh embodiment of the present disclosure.
Figure 12:
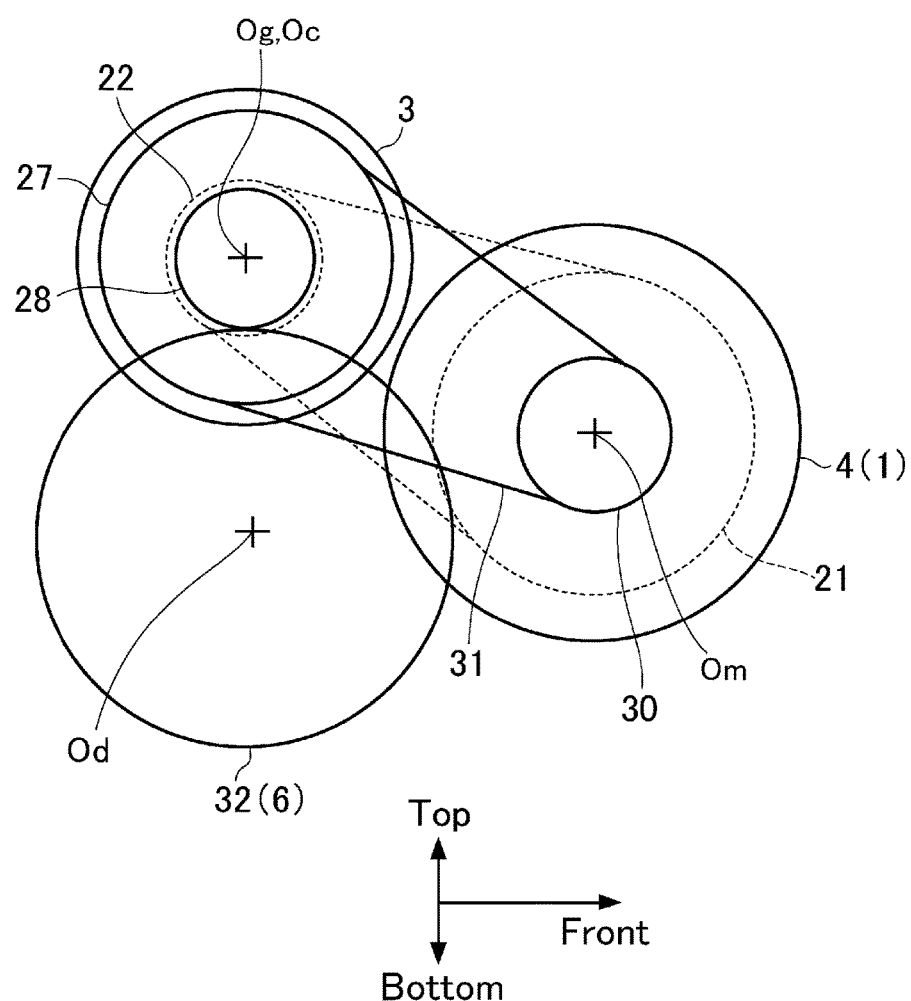
FIG. 12 is an explanatory drawing showing rotational center axes in the hybrid drive unit shown in FIG. 11.

Turning to FIG. 11, there is shown the seventh embodiment in which the hybrid drive unit according to the third embodiment shown in FIG. 6 is modified into so called a "three-shaft drive unit". In the following description, detailed explanation for the elements in common with those in the third embodiment will be omitted by allotting common reference numerals thereto. In the transaxle shown in FIG. 11, the countershaft 29 is formed into a hollow cylindrical shaft, and arranged coaxially with the rotor shaft 8 of the generator 3. The rotor shaft 8 extends beyond the chain drive unit 25 and the reduction gear mechanism 26 while penetrating through the countershaft 29, and the driven sprocket 22 is mounted on a protruding end of the rotor shaft 8. That is, the chain drive unit 20 for driving the generator 3 and the chain drive unit 25 for transmitting the torque of the motor 4 to the reduction gear mechanism 26 are disposed between the generator 3 and the motor 4, and the engine 1. In the transaxle 2 according to the seventh embodiment, as shown in FIG. 12, the rotational center axis Og of the generator 3 and the rotational center axis Oc of the countershaft 29 are aligned to each other. According to the seventh embodiment, therefore, the hybrid drive unit can be further downsized.

In addition, according to the seventh embodiment, the chain drive unit 25 may be isolated away from the end cover 15 which may cause the membrane oscillation. According to the seventh embodiment, therefore, it is possible to prevent leakage of noise of the chain 23 running on the drive sprocket 21 and the driven sprocket 22, and noise of the chain 31 running on the drive sprocket 30 and the driven sprocket 27.

Although the above exemplary embodiments of the present disclosure have been described, it will be understood by those skilled in the art that the present application should not be limited to the described exemplary embodiments, and various changes and modifications can be made within the scope of the present disclosure.

What is claimed is:

1. A series hybrid drive unit, in which a generator is driven by an engine, and a motor is operated by electricity generated by the generator to generate a torque to be delivered to drive wheels through a final reduction unit, comprising:
    an input member that is rotated by a torque of the engine, and that is arranged such that a rotational center axis thereof extends parallel to a rotational center axis of the generator,
    wherein the generator and the motor are arranged such that the rotational center axis of the generator and a rotational center axis of the motor extend parallel to each other while keeping a predetermined clearance,
    the final reduction unit is arranged such that a rotational center axis of the final reduction unit extends parallel to the rotational center axis of the motor,
    the series hybrid drive unit further comprises:
    a first wrapping transmission mechanism including a first drive sheave mounted on the input member, a first driven sheave mounted on the generator, and a first transmission member applied to the first drive sheave and the first driven sheave to transmit a torque therebetween; and
    a second wrapping transmission mechanism including a second drive sheave mounted on the motor, a second transmission member applied to the second drive sheave, and a second driven sheave to which the second transmission member is applied and which transmits the torque to the final reduction unit.

2. The series hybrid drive unit as claimed in claim 1, wherein the first transmission member includes a chain, the first drive sheave and the first driven sheave include a sprocket to which the chain is applied, the second transmission member includes another chain, and the second drive sheave and the second driven sheave include a sprocket to which said another chain is applied.

3. The series hybrid drive unit as claimed in claim 1, wherein the input member and the motor are arranged coaxially to each other.

4. The series hybrid drive unit as claimed in claim 1, wherein the first wrapping transmission mechanism and the second wrapping transmission mechanism are disposed on both sides of the generator and the motor in a direction of the rotational center axis of the generator and the rotational center axis of the motor.

5. The series hybrid drive unit as claimed in claim 4, further comprising:
a case;
a housing attached to a first end of the case;
an end cover attached to a second end of the case;
a first support member as a partition wall formed in the case in the housing side;
a second support member as a partition wall formed in the case in the end cover side;
a first chamber formed between the first support member and the second support member to hold the generator and the motor therein;
a fifth chamber formed between the first support member and the housing to hold the second wrapping transmission mechanism and the final reduction unit;
a sixth chamber formed between the second support member and the end cover to hold the first wrapping transmission mechanism; and
a first bearing that rotatably supports the first drive sheave,
wherein the first bearing is installed in the second support member.

6. The series hybrid drive unit as claimed in claim 1, wherein both of the first wrapping transmission mechanism and the second wrapping transmission mechanism are disposed on one side of the generator and the motor in a direction of the rotational center axis of the generator and the rotational center axis of the motor.

7. The series hybrid drive unit as claimed in claim 1, further comprising:
a case;
a housing attached to a first end of the case;
an end cover attached to a second end of the case;
a first chamber formed in the case; and
a second chamber that is formed adjacent to the first chamber by the case and at least any one of the housing and the end cover,
wherein the generator and the motor are held in the first chamber, and
the first wrapping transmission mechanism and the second wrapping transmission mechanism are held in the second chamber.

8. The series hybrid drive unit as claimed in claim 1, further comprising:
a case;
a housing attached to a first end of the case;
an end cover attached to a second end of the case;
a bulkhead that is formed in the case to divide an internal space of the case into a section opening toward the housing and a section opening toward the end cover;
a third chamber formed by closing the section opening toward the housing by the housing; and
a fourth chamber formed by closing the section opening toward the end cover by the end cover,
wherein the generator and the first wrapping transmission mechanism are held in the fourth chamber, and
the motor and the second wrapping transmission mechanism are held in the third chamber.

9. The series hybrid drive unit as claimed in claim 1, wherein the generator includes a first rotor shaft that is rotatably supported at both ends in an axial direction, the motor includes a second rotor shaft that is supported rotatably at both ends in the axial direction, the first driven sheave is mounted on the first rotor shaft between the end portions supported rotatably, and the second driven sheave is mounted on the second rotor shaft between the end portions supported rotatably.

10. The series hybrid drive unit as claimed in claim 1, further comprising:
a gear mechanism that transmits a torque from the second wrapping transmission mechanism to the final reduction unit,
wherein the gear mechanism includes a drive gear that is rotated integrally with the second driven sheave,
the final reduction unit includes a ring gear meshing with the drive gear, and
the drive gear and the ring gear include a double helical gear.

11. The series hybrid drive unit as claimed in claim 1, further comprising:
a clutch device that selectively connects the input member to the motor.

12. The series hybrid drive unit as claimed in claim 1, further comprising:
a case;
a housing attached to a first end of the case; and
an end cover attached to a second end of the case,
wherein the generator, the motor, the second wrapping transmission mechanism, and the final reduction unit are held in a chamber formed by the case, the housing, and the end cover, and
the input member and the first wrapping transmission mechanism are disposed outside of the chamber while being adjacent to the housing.

13. The series hybrid drive unit as claimed in claim 12, wherein the first wrapping transmission mechanism includes a belt-driven transmission mechanism.

14. The series hybrid drive unit as claimed in claim 1, wherein the second driven sheave is arranged coaxially with the generator.

* * * * *